United States Patent [19]

Semple, Jr.

[11] Patent Number: 5,377,402

[45] Date of Patent: Jan. 3, 1995

[54] ELECTRICAL INSULATOR CHANGE-OUT TOOL

[76] Inventor: Alan R. Semple, Jr., R.R. #1-Box 132, Monroe, N.H. 03771

[21] Appl. No.: 144,234

[22] Filed: Oct. 27, 1993

[51] Int. Cl.⁶ .............................................. H01R 43/00
[52] U.S. Cl. ........................................ 29/745; 29/256; 29/631; 29/762
[58] Field of Search ............... 29/745, 762, 631, 426.5, 29/256

[56] References Cited

U.S. PATENT DOCUMENTS 4,189,828 2/1980 Chadwick, Jr. ...................... 29/762

Primary Examiner—Carl E. Hall
Attorney, Agent, or Firm—Richard J. Birch

[57] ABSTRACT

A tool for relieving strain on a plurality of serially connected elements, such as, electrical insulators in a strong of insulators. The tool has two separate rachetable turnbuckles that each actuate a pair of opposite-hand jack screws. A strain diverter collar having a set of strain diverter halves is clamped around an electrical insulator and is releasably secured to corresponding jack screws actuated by the rachetable turnbuckles. In one embodiment, another set of strain diverter halves is clamped around another electrical insulator and is releasably secured to the other corresponding jack screws so that racheting of the turnbuckles in one direction relieves strain on the insulators and in the other direction reapplies strain on the insulators.

8 Claims, 8 Drawing Sheets

1

ELECTRICAL INSULATOR CHANGE-OUT TOOL

BACKGROUND OF THE INVENTION

The present invention relates generally to relieving and reapplying strain to a plurality of serially connected elements and, more particularly, to an electrical insulator change-out tool for use with electrical insulators in high tension lines.

High tension electrical lines are supported by and electrically insulated from towers through a plurality of electrical insulators connected in series. The electrical insulators in operation are under strain generated by the weight of the high tension lines. Replacement of a damaged electrical insulator in the series of insulators is a laborious process because tension must be taken off of the insulator or insulators before the insulator can be removed from the string and replaced with a new insulator.

A variety of tools have been described in the art to remove tension from a string of electrical insulators. See, for example, U.S. Pat. No. 1,997,109 issued to L. T. Fyfe for "Apparatus For Repairing String Insulators" and U.S. Pat. No. 4,760,640 issued to William G. Lawrence for "Insulator-Jack For Replacing Insulated Disks". The Fyfe and Lawrence devices are both cumbersome and awkward to use. In the case of Fyfe, separate clamping elements are threaded onto rods and then clamped around the porcelain portion of the electrical insulator. In the case of the Lawrence insulator-jack, the insulator clamping elements are permanently attached to L-shaped brackets that are secured to parallel threaded rods. In both the Fyfe and Lawrence devices, no provision is made for removing the end insulator from a string of electrical insulators.

It is, accordingly, a general object of the invention to provide an electrical insulator change-out tool.

It is a specific object of the invention to provide an electrical insulator change-out tool that accommodates a variety of electrical insulator configurations.

It is a further object of the invention to provide an electrical insulator change-out tool that can remove the end insulator from either the hot or cold ends of the insulator string.

It is a feature of the invention that the insulator change-out tool can be easily reconfigured to accommodate variations in the arrangement of electrical insulator strings.

SUMMARY OF THE INVENTION

The electrical insulator change-out tool has two separate rachetable turnbuckles that each actuate a pair of opposite-hand jack screws. A strain diverter collar having a set of strain diverter halves is clamped around an electrical insulator and is releasably secured to the jack screws actuated by the rachet hubs. In one embodiment, another set of strain diverter halves is clamped around a second electrical insulator and is releasably secured to the other jack screws so that ratcheting of the turnbuckles in one direction relieves strain on the insulators and in the other direction reapplies strain on the insulators. Inserts are provided for use with the strain diverter halves to accommodate both hot and cold end configurations.

BRIEF DESCRIPTION OF THE DRAWINGS

The objects And features of the present invention will be best understood from a detailed description of a preferred embodiment thereof, selected for purposes of illustration, and shown in the accompanying drawings in which.

DETAILED DESCRIPTION OF A PREFERRED EMBODIMENT

Figure 1:
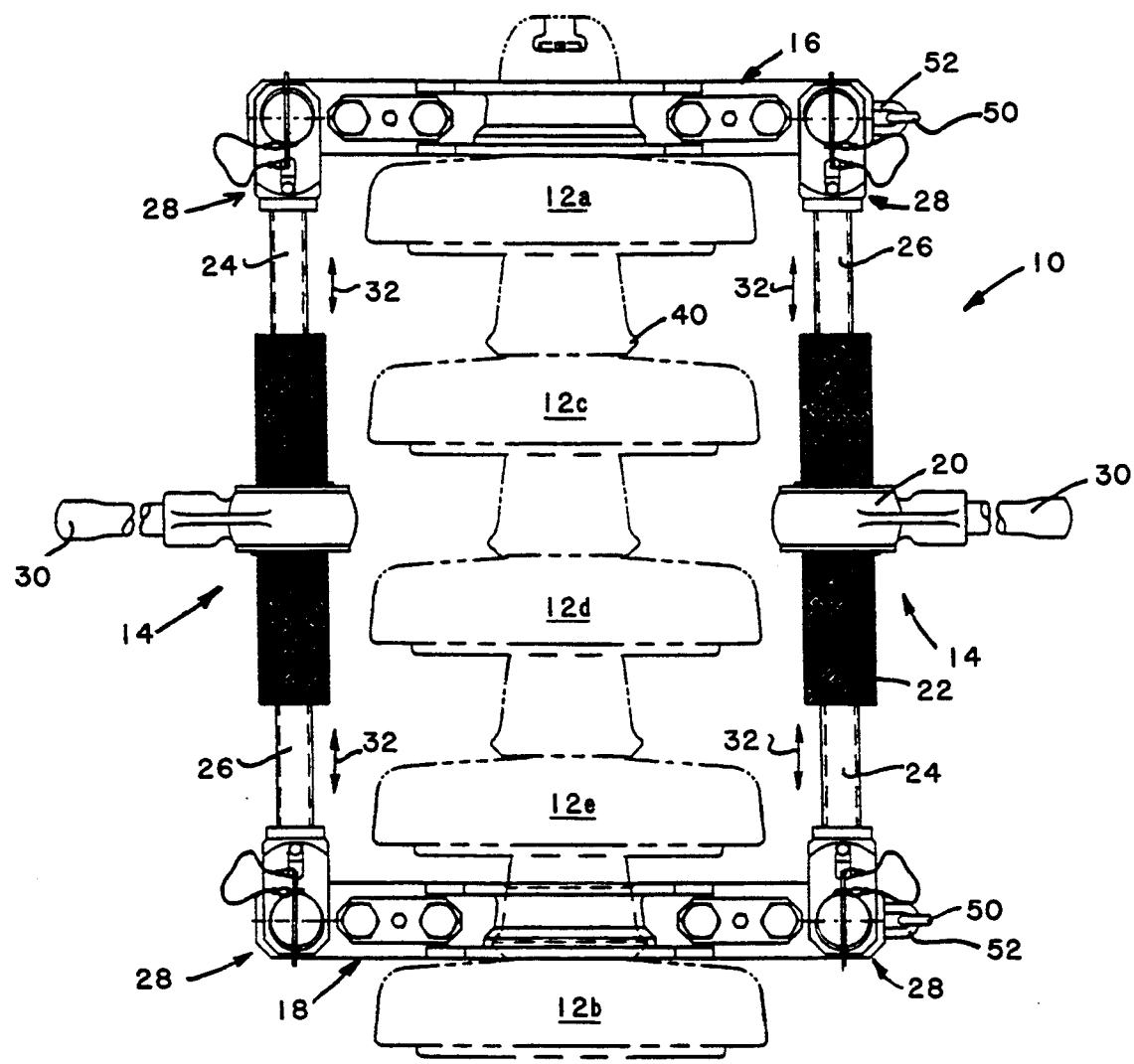
FIG. 1 is a view in side elevation of the insulator change-out tool of the present invention with serially connected electrical insulators shown in dashed lines.

Referring now to the drawings and, particularly to FIG. 1 thereof, there is shown in side elevation an electrical insulator change-out tool constructed in accordance with the present invention and indicated generally by the reference numeral 10. A series of electrical insulators 12a–12e are depicted by dashed lines. The insulator change-out tool 10 has two identical jacking assemblies indicated generally by the reference numeral 14. The jacking assemblies 14 are used to move two identical strain diverter collars 16 and 18 that are clamped around insulators 12a and 12b, respectively.

The jacking assembly 14 comprises a rachetable hub 20, turnbuckle 22, left-hand and right-hand jack screws 24 and 26, respectively, and a clevis assembly 28. Rotation of the rachetable hub 20 is accomplished by means of a rachet handle 30. Rotation of the rachet handle 30 causes the left-hand and right-hand jack screws 24 and 26, respectively, to move outwardly or inwardly with respect to the rachetable hub 20 through turnbuckle 22. Motion of the jack screws is indicated by the double headed arrows 32.

The strain diverter collars 16 and 18 clamped around insulators 12a and 12b, respectively, are mechanically connected to the clevis assembly 28 so that movement of the left and right-hand jack screws 24 and 26 will relieve or reapply strain to the electrical insulators. It will be appreciated that once the strain has been removed on the insulators 12c, 12d and 12e located between the clamped insulators 12a and 12b, one or more of the insulators 12c–12e can be removed and replaced.

Figure 2:
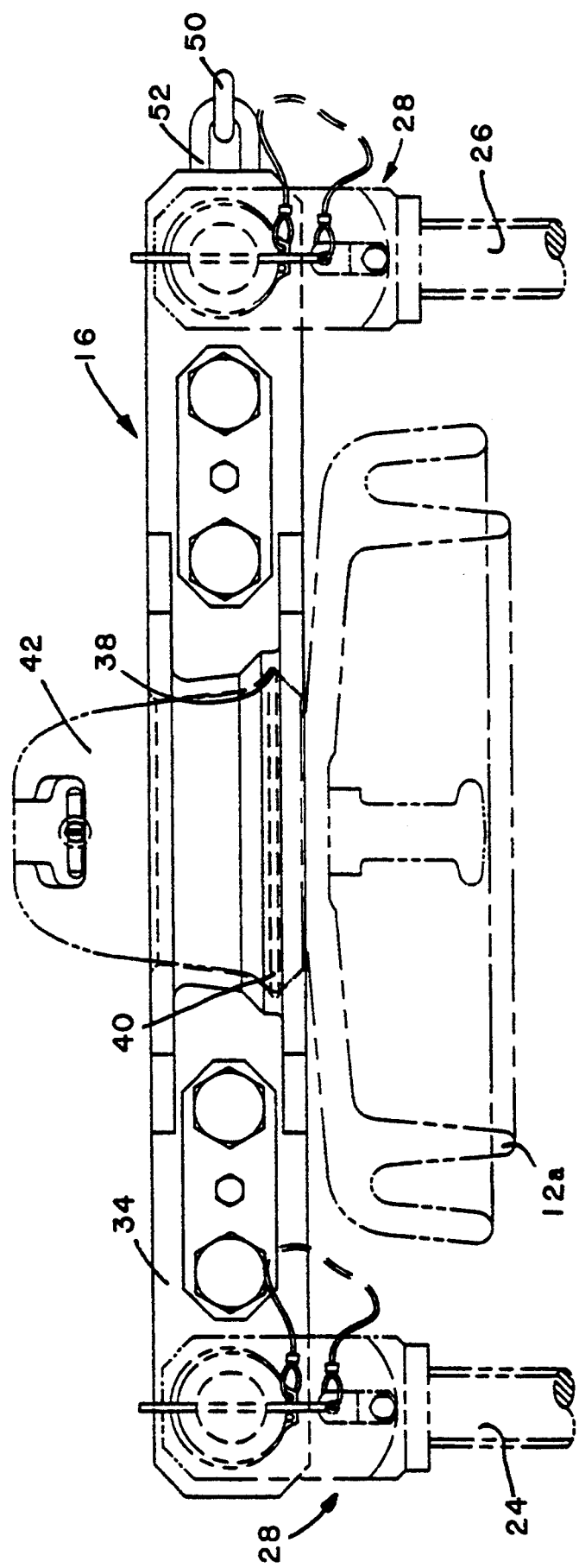
FIG. 2 is an enlarged view of the upper strain diverter collar shown in FIG. 1.
Figure 3:
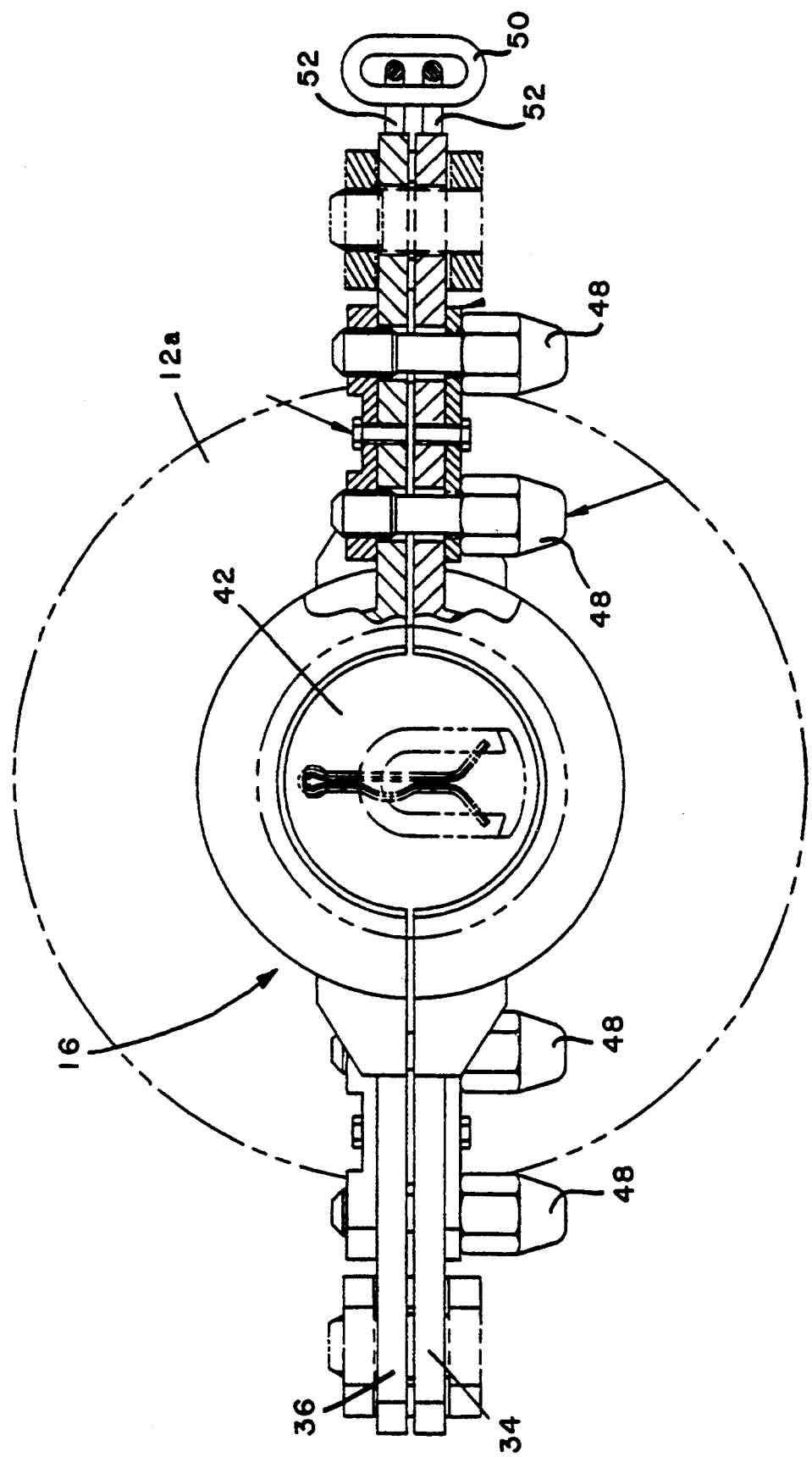
FIG. 3 is a plan view illustrating the left and right halves of the strain diverter collar.
Figure 4:
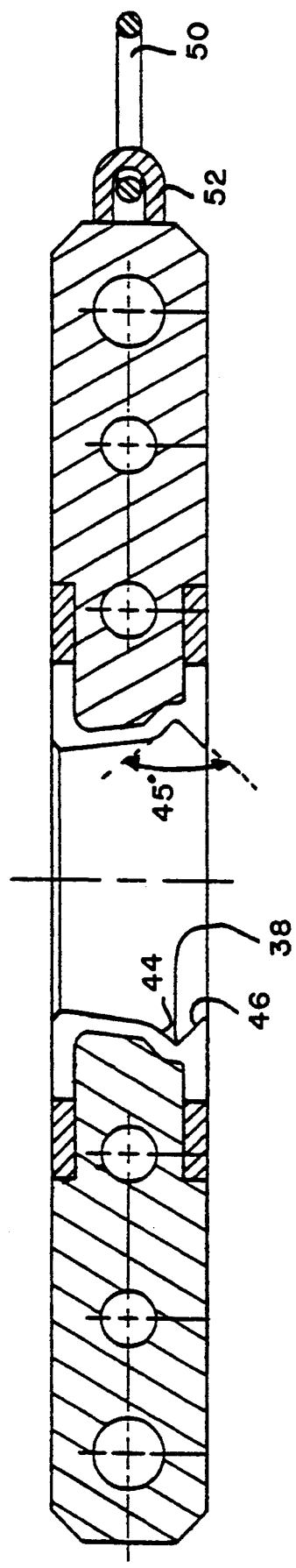
FIG. 4 is a view in section taken along lines 4—4 of FIG. 3.

Referring now to FIGS. 2, 3, and 4, the strain diverter collar 16 and its duplicate strain diverter collar 18 comprise two clamping plates 34 and 36, each having a semicircular, annular groove 38, as best seen in FIGS. 2 and 4, that collectively define an annular groove surrounding a brim 40 of the electrical insulator's hat 42. Preferably, the semicircular annular groove 38 has sidewalls 44 and 46 that intersect at a 45-degree angle as illustrated in FIG. 4.

The two clamping plates 34 and 36 are releasably held together by means of fasteners 48. Preferably, the two clamping plates 34 and 36 are maintained in secured relation to each other by means of a retaining ring 50 extending through U-shaped extensions 52 located at one end of each of the clamping plates.

One of the advantages of the present invention is that the insulator change-out tool 10 can be configured to accommodate a variety of electrical insulator configurations. For example, referring to FIGS. 5 and 6, a cold end link 54 having a collar 56 is secured to insulator 12. In this configuration, a cold end link adapter 58 is clamped within the annular groove 38 formed by the two strain diverter halves 34 and 36. The adapter 58 has a generally C-shaped inwardly slanting portion 60. The angle of the inwardly slanted edge 62 corresponds to the angle formed by groove edge 46 (see FIG. 4) with the surface of clamping plate 34.

Figure 5:
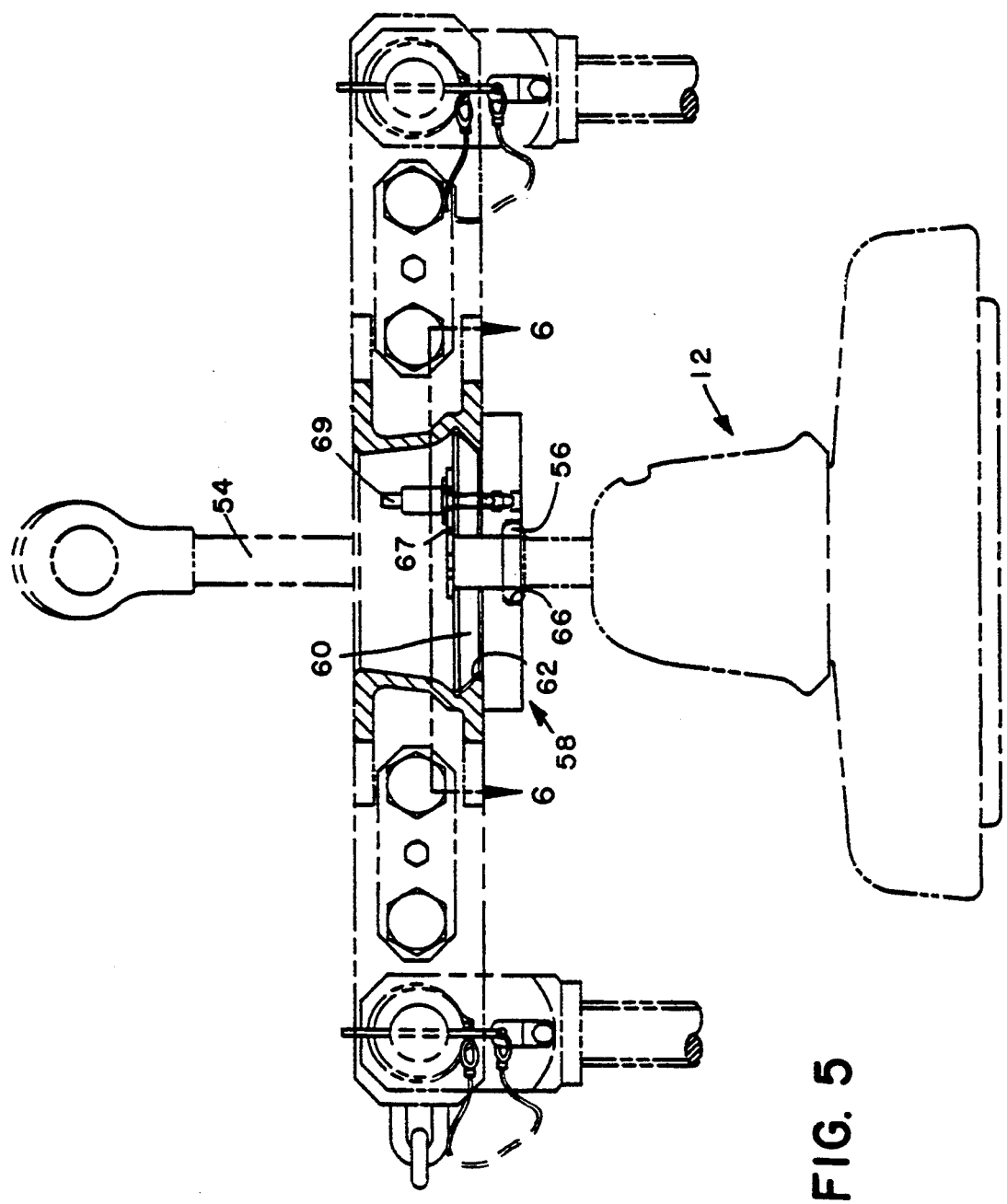
FIG. 5 is a view in side elevation and partial section showing a cold end link adapter clamped between the strain diverter halves.
Figure 6:
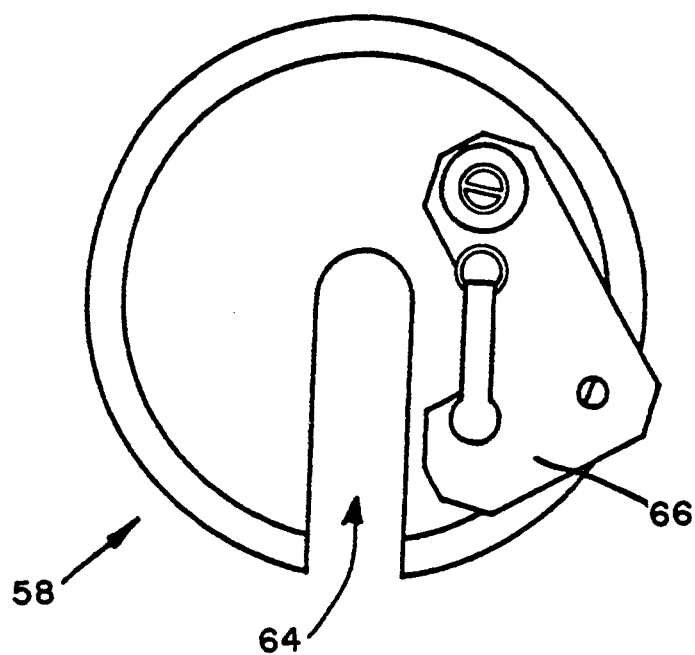
FIG. 6 is a plan view of the adapter of FIG. 5.

It can be seen from FIG. 6 that the opening 64 of the C-shaped adapter 58 accommodates the shaft of cold end link 54 when the adapter is positioned as shown in FIG. 5. The adapter 58 also has an enlarged bore portion 66 that accommodates the diameter of the collar 56 of the cold end link.

The adapter 58 preferably is provided with a retaining plate 67 and a single acting ball lock pin 69.

Figure 7:
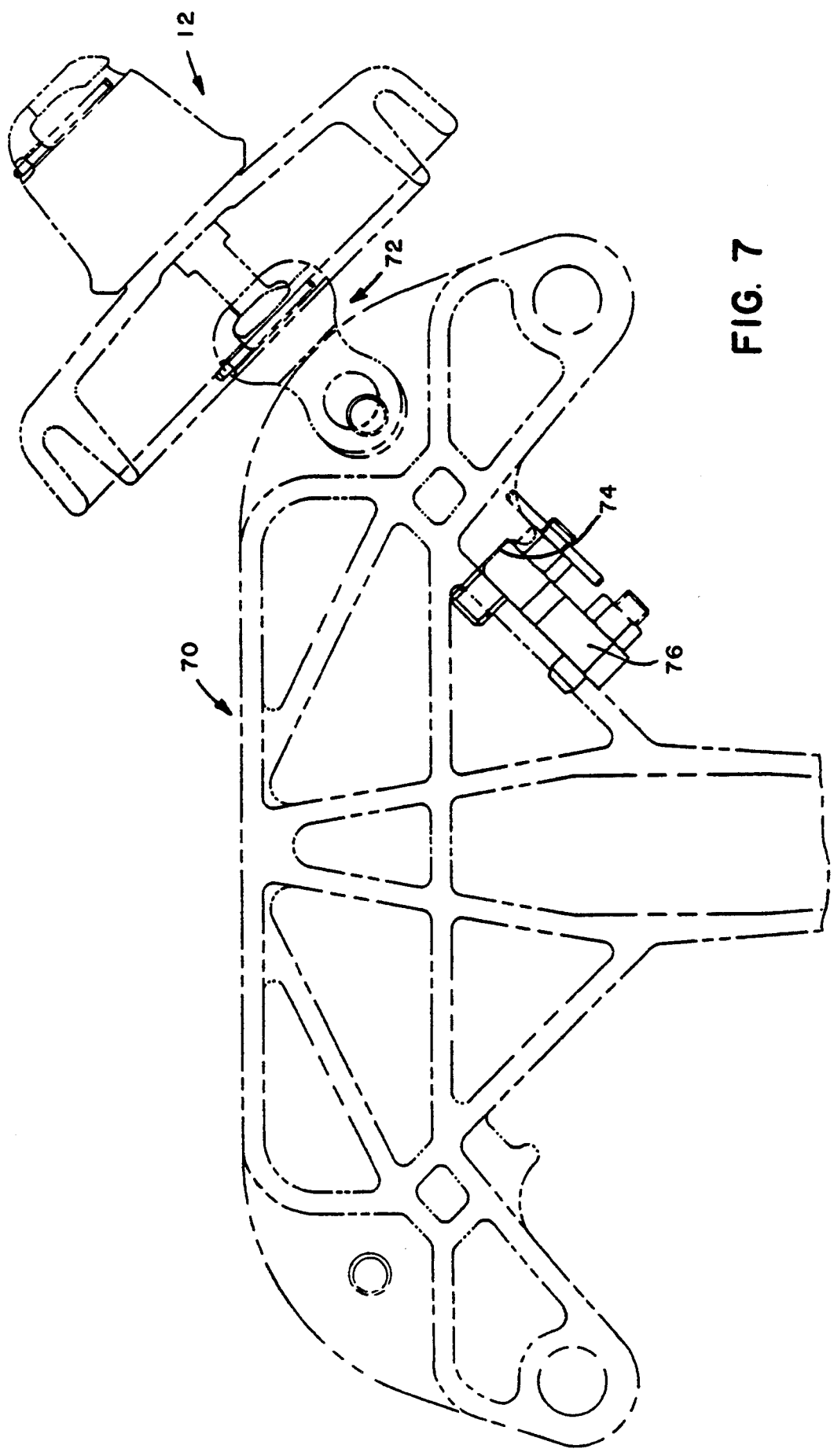
FIG. 7 is a front view of a conventional V-string yoke and electrical insulator shown in dashed lines with a change-out tool yoke attached to the V-string yoke; and, FIG. 8 is a side view of the elements shown in FIG. 7.
Figure 8:
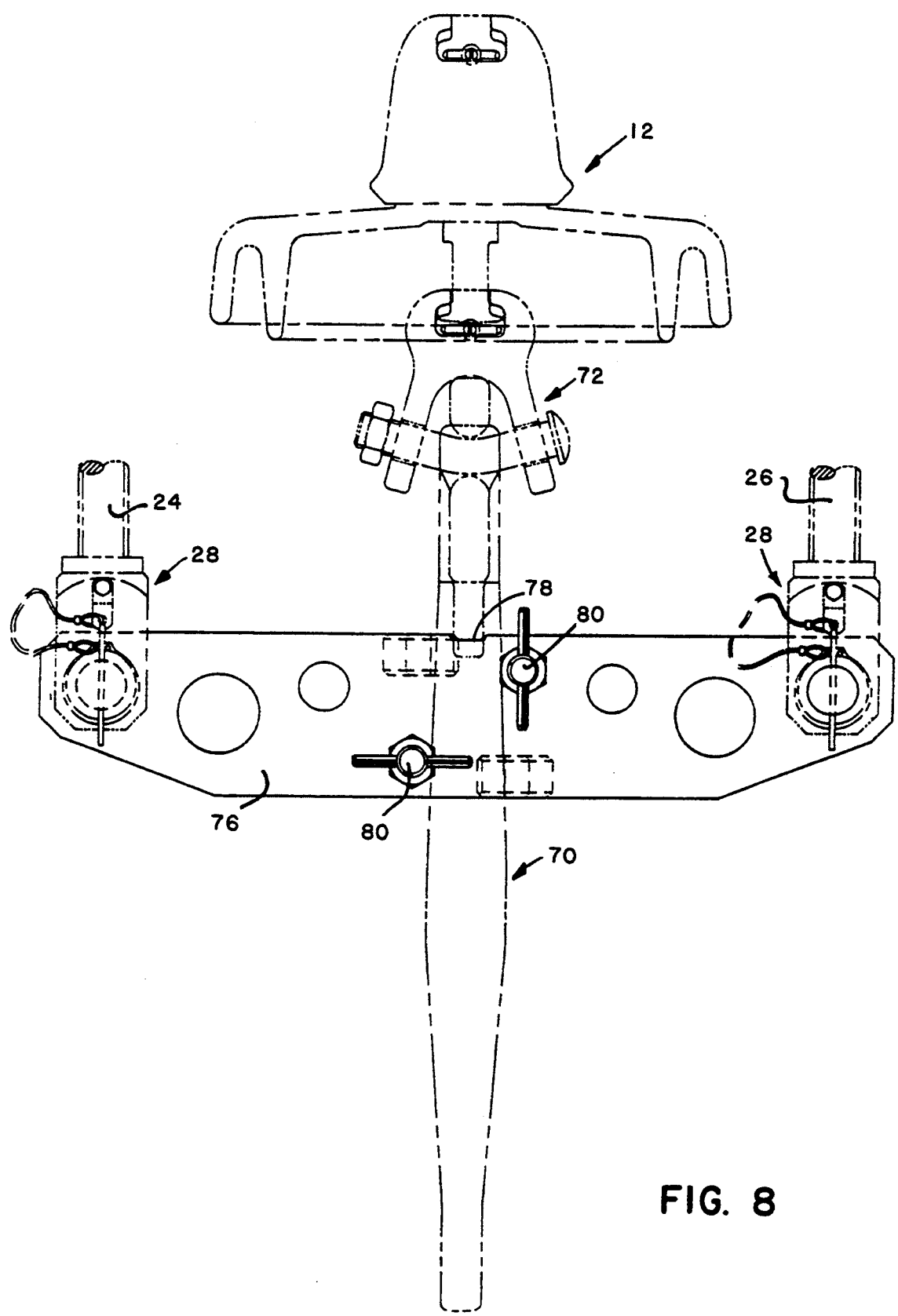

Referring now to FIGS. 7 and 8, there is shown in front and side elevation a conventional V-string yoke indicated generally by the reference numeral 70 and one insulator 12 of a string of insulators that are connected to the V-string yoke 70 through linkage 72. The V-string yoke 70 has a notch 74 as best seen in FIG. 7. The notch 74 provides a mounting surface for the change-out tool yoke 76 which has a corresponding notch 78. The tool yoke 76 is secured to the V-string yoke 70 by means of fasteners 80. It can be seen from FIGS. 7 and 8 that the plane of the change-out tool yoke 76 is normal to the plane of the V-string yoke 70. This configuration permits the removal of one or more of the string of insulators 12 (only one of which is shown in FIG. 7) by moving Jack screws 24 and 26 through actuation of the rachetable hub 20.

It will be appreciated that the insulator change-out tool can be employed with electrical insulators under compression as well as tension. Furthermore, the insert 58 can have a variety of fastening components incorporated therein so that the insert can be fastened to different electrical system structures.

Having described in detail a preferred embodiment of my invention, it will now be obvious to those skilled in the art that numerous modifications can be made therein without departing from the scope of the invention as defined in the following claims.

What I claim is:

1. Apparatus for replacing electrical insulators in a string of insulators under strain, said apparatus comprising:
   A. a first strain relief assembly comprising:
      a rachetable turnbuckle; and,
      two opposite-hand screws connected each at one end to and actuated by said rachetable turnbuckle;
   B. a second strain relief assembly comprising:
      a rachetable turnbuckle; and,
      two opposite-hand screws connected each at one end to and actuated by said rachetable turnbuckle;
   C. a first strain diverter collar assembly comprising:
      two strain diverter halves having electrical insulator clamping means for clamping around one of said electrical insulators when the two strain diverter halves are secured together at both ends thereof; and,
      means for releasably securing together said strain diverter halves;
   D. a second strain diverter collar assembly comprising:
      two strain diverter halves having electrical insulator clamping means for clamping around one of said electrical insulators when the two strain diverter halves are secured together at both ends thereof; and,
      means for releasably securing together said strain diverter halves;
   E. means for releasably securing the first strain diverter collar assembly to corresponding screws of said opposite-hand screws in said first and second strain relief assemblies;
   F. means for releasably securing the second strain diverter collar assembly to the other corresponding screws of said opposite-hand screws in said first and second strain relief assemblies;

whereby when said ratchetable turnbuckles are actuated in one direction, strain on electrical insulators positioned between the two clamped electrical insulators is relieved and when the rachetable turnbuckles are actuated in the opposite direction, strain is reapplied to the string of electrical insulators.

2. The apparatus of claim 1 wherein the clamping means of the strain diverter halves together define an annular groove having a cross-sectional configuration corresponding to the configuration of a portion of one of the electrical insulators whereby said portion is clamped within said annular groove.

3. The apparatus of claim 2 wherein the annular groove has a generally V-shaped cross-sectional configuration.

4. Apparatus for replacing electrical insulators in a string of insulators under strain with an end insulator supported by at least one linkage shaft having an intermediately positioned collar, said apparatus comprising:
   A. a first strain relief assembly comprising:
      a ratchetable turnbuckle; and,
      two opposite-hand screws connected each at one end to and actuated by said ratchetable turnbuckle;
   B. a second strain relief assembly comprising:
      a ratchetable turnbuckle; and,
      two opposite-hand screws connected each at one end to and actuated by said rachetable turnbuckle;
   C. a first strain diverter collar assembly comprising:
      two strain diverter halves including holding means for holding the collar of said at least one linkage shaft when the two strain diverter halves are secured together at both ends thereof; and,
      means for releasably securing together said strain diverter halves;
   D. a second strain diverter collar assembly comprising:
      two strain diverter halves having electrical insulator clamping means for clamping around one of said electrical insulators, other than said end insulator, when the two strain diverter halves are secured together at both ends thereof; and,
      means for releasably securing together said strain diverter halves;
   E. means for releasably securing the first strain diverter collar assembly to corresponding screws of said opposite-hand screws in said first and second strain relief assemblies;

F. means for releasably securing the second strain diverter collar assembly to the other corresponding screws of said opposite-hand screws in said first and second strain relief assemblies;

whereby when said rachetable turnbuckles are actuated in one direction, strain on electrical insulators positioned between the end insulator and said one of said electrical insulators is relieved and when the rachetable turnbuckles are actuated in the opposite direction, strain is reapplied to the string of electrical insulators.

5. The apparatus of claim 4 wherein said first strain diverter collar assembly halves have means for defining an annular groove when said halves are secured together and wherein said holding means comprises an insert positioned within and held by said annular groove and having a through bore with a first diameter portion corresponding to the diameter of the linkage shaft collar and a reduced diameter portion corresponding to the diameter of the linkage shaft.

6. Apparatus for replacing electrical insulators in a string of insulators under tension which support a conductor V-string suspension assembly having a generally planar multiple conductor yoke, said apparatus comprising:

A. a generally planar longitudinal extending V-string yoke having notch means for engaging a portion of the multiple conductor yoke with the plane of said V-string yoke being normal to the plane of said multiple conductor yoke;

B. a first strain relief assembly comprising:
   a rachetable turnbuckle; and,
   two opposite-hand screws connected each at one end to and actuated by said rachetable turnbuckle;

C. a second strain relief assembly comprising:
   a rachetable turnbuckle; and,
   two opposite-hand screws connected each at one end to and actuated by said rachetable turnbuckle;

D. a strain diverter collar assembly comprising:
   two strain diverter halves having electrical insulator clamping means for clamping around one of said electrical insulators when the two strain diverter halves are secured together at both ends thereof; and,
   means for releasably securing together said strain diverter halves;

E. means for releasably securing the strain diverter collar assembly to corresponding screws of said opposite-hand screws in said first and second strain relief assemblies;

F. means for releasably securing the V-string yoke to the other corresponding screws of said opposite-hand screws in said first and second strain relief assemblies;

whereby when said rachetable turnbuckles are actuated in one direction, strain on electrical insulators positioned between the V-string yoke and the clamped electrical insulator is relieved and when the rachetable turnbuckle is actuated in the opposite direction, strain is reapplied to the string of electrical insulators under tension.

7. Apparatus for replacing electrical insulators in a string of insulators under tension which support a conductor V-string suspension assembly having a generally planar multiple conductor yoke with a dead end insulator supported by at least one linkage shaft having an intermediately positioned collar, said apparatus comprising:

A. a generally planar longitudinal extending V-string yoke having notch means for engaging a portion of the multiple conductor yoke with the plane of said V-string yoke being normal to the plane of said multiple conductor yoke;

B. a first strain relief assembly comprising:
   a rachetable turnbuckle; and,
   two opposite-hand screws connected each at one end to and actuated by said rachetable turnbuckle;

C. a second strain relief assembly comprising:
   a rachetable turnbuckle; and,
   two opposite-hand screws connected each at one end to and actuated by said rachetable turnbuckle;

D. a strain diverter collar assembly comprising:
   two strain diverter halves including holding means for holding the collar of said at least one linkage shaft when the two strain diverter halves are secured together at both ends thereof; and,
   means for releasably securing together said strain diverter halves;

E. means for releasably securing the strain diverter collar assembly to corresponding screws of said opposite-hand screws in said first and second strain relief assemblies;

F. means for releasably securing the V-string yoke to the other corresponding screws of said opposite-hand screws in said first and second strain relief assemblies;

whereby when said rachetable turnbuckles are actuated in one direction, strain on electrical insulators positioned between the V-string yoke and the clamped electrical insulator is relieved and when the rachetable turnbuckle is actuated in the opposite direction, strain is reapplied to the string of electrical insulators under tension.

8. The apparatus of claim 7 wherein said first strain diverter collar assembly halves have means for defining an annular groove when said halves are secured together and wherein said holding means comprises an insert positioned within and held by said annular groove and having a through bore with a first diameter portion corresponding to the diameter of the linkage shaft collar and a reduced diameter portion corresponding to the diameter of the linkage shaft.

* * * * *